United States Patent
Sawtelle

(10) Patent No.: US 6,676,070 B2
(45) Date of Patent: Jan. 13, 2004

(54) BACKWARD COMPATIBLE TAPE SUPPORT

(75) Inventor: Homer Sawtelle, Manchester, NH (US)

(73) Assignee: Quantum Corporation, San Jose, CA (US)

( * ) Notice: Subject to any disclaimer, the term of this patent is extended or adjusted under 35 U.S.C. 154(b) by 21 days.

(21) Appl. No.: 09/923,293

(22) Filed: Aug. 3, 2001

(65) Prior Publication Data

US 2003/0025031 A1 Feb. 6, 2003

(51) Int. Cl.[7] .............................................. B65H 23/04
(52) U.S. Cl. ......................... 242/615; 242/335; 360/95
(58) Field of Search ................................. 242/335, 615, 242/615.3, 615.4, 548.2; 360/95, 96.1

(56) References Cited

U.S. PATENT DOCUMENTS

| | | |
|---|---|---|
| 3,850,358 A | 11/1974 | Nettles |
| 4,150,773 A | 4/1979 | Fell et al. |
| 4,403,720 A | 9/1983 | Grant |
| 4,441,133 A | 4/1984 | Ogawa et al. |
| 4,477,851 A | 10/1984 | Dalziel et al. |
| 5,005,748 A | 4/1991 | Kim |
| 5,307,971 A | 5/1994 | Evans |
| 5,414,585 A | 5/1995 | Saliba |
| 5,447,279 A | 9/1995 | Janssen et al. |
| 5,501,386 A | 3/1996 | Kobayashi |
| 6,092,754 A | 7/2000 | Rathweg et al. |
| 6,267,325 B1 * | 7/2001 | Rathweg ................. 242/615.2 |

OTHER PUBLICATIONS

U.S. Pending Application Ser. No. 09/311,651, Rathweg, filed May 13, 1999.

* cited by examiner

Primary Examiner—John Q. Nguyen
(74) Attorney, Agent, or Firm—Morrison & Foerster LLP

(57) ABSTRACT

A tape guide (38) that provides support for a storage tape (30) of a tape drive (10) during a loss of tension of the storage tape (30). The tape drive (10) includes a drive housing (12), a tape roller (34) having a longitudinal axis (36), and the tape guide (38). The tape guide (38) includes a guide body (40) coupled to the drive housing (12), and a tape support (42) secured to the guide body (40). The tape support (42) has a support width (126) that is greater than a support thickness (124). The tape support (42) can include a curved region (120). Moreover, the tape support (42) can include a support backing (122) that secures the tape support (42) to the guide body (40). The size, shape and positioning of the tape support (42) allows greater flexibility in a lateral direction that generally follows a tape path (32) than in a direction that is substantially parallel to the longitudinal axis (36) of the tape roller (34).

36 Claims, 7 Drawing Sheets

BACKWARD COMPATIBLE TAPE SUPPORT

FIELD OF THE INVENTION

The present invention relates generally to tape drives. More specifically, the present invention relates generally to a tape guide for maintaining proper positioning of a storage tape in a tape drive.

BACKGROUND

Cartridges that have a magnetic storage tape are commonly used to store relatively large amounts of information in digital form. These cartridges have become increasingly efficient to use due to their low cost, portability, and substantial storage capacity. In contrast to hard disks that are relatively inaccessible within the hard disk drive assembly, the cartridge is easily removed from a tape drive, and can be economically transferred to remote locations for use in another tape drive.

A typical cartridge includes a supply reel and the storage tape having a substrate, a coating of magnetic recording material on one side of the substrate, and a high durability "back coating" on the other side of the substrate. The tape drive includes a take-up reel and a head assembly having one or more write heads and one or more read heads for transferring data to and from the storage tape. The tape drive also typically includes a guide system for guiding travel of the storage tape along a tape path back and forth between the supply reel, the heads and the take-up reel. The guide system can include a series of rotatable tape rollers and one or more stationary tape guides, between which the storage tape travels. Tension in the storage tape during operation of the tape drive maintains the storage tape properly positioned for reading and/or writing by the heads.

Unfortunately, when the required storage tape tension is lost, e.g. during loss of power to the tape drive, the storage tape can slip out from between the tape rollers and the tape guide. When this occurs, the tape drive becomes temporarily inoperable, and damage to the storage tape can result.

In light of the above, the need exists to provide a tape drive that inhibits excessive misalignment of the storage tape in the event the required tension in the storage tape is lost. Another need exists to provide a tape drive that is relatively cost efficient to manufacture and utilize.

SUMMARY

The present invention is directed to a tape guide of a guide assembly that can be used with a tape drive that uses a cartridge. The cartridge includes a storage tape. The tape drive also includes a drive housing. The guide assembly guides travel of the storage tape within the tape drive along a tape path. The guide assembly includes a tape roller having a longitudinal axis, and the tape guide. The tape guide includes a guide body coupled to the drive housing, and a tape support coupled to the guide body and positioned near the tape path. The tape support has a support width that is measured in a direction that is substantially parallel to the longitudinal axis of the tape roller, and a support thickness that is measured in a direction that is substantially perpendicular to the longitudinal axis of the tape roller. In some embodiments, the support width is greater than the support thickness. With this design, the tape support provides support for the storage tape during a loss of tension of the storage tape.

Additionally, the tape support can extend from the guide body toward the tape roller. The tape support can be formed from a substantially flat film material. In some embodiments, the tape support includes a curved region positioned below the tape path. Moreover, the tape support can include a support backing that secures the tape support to the guide body. The guide body can have a body opening through which the tape support extends. The size, shape and positioning of the tape support provides greater flexibility in a lateral direction that generally follows the tape path than in a direction that is substantially parallel to the longitudinal axis of the tape roller.

The present invention is also directed to a guide assembly, a tape drive, a tape library, and a method for maintaining proper positioning of a storage tape used in a tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
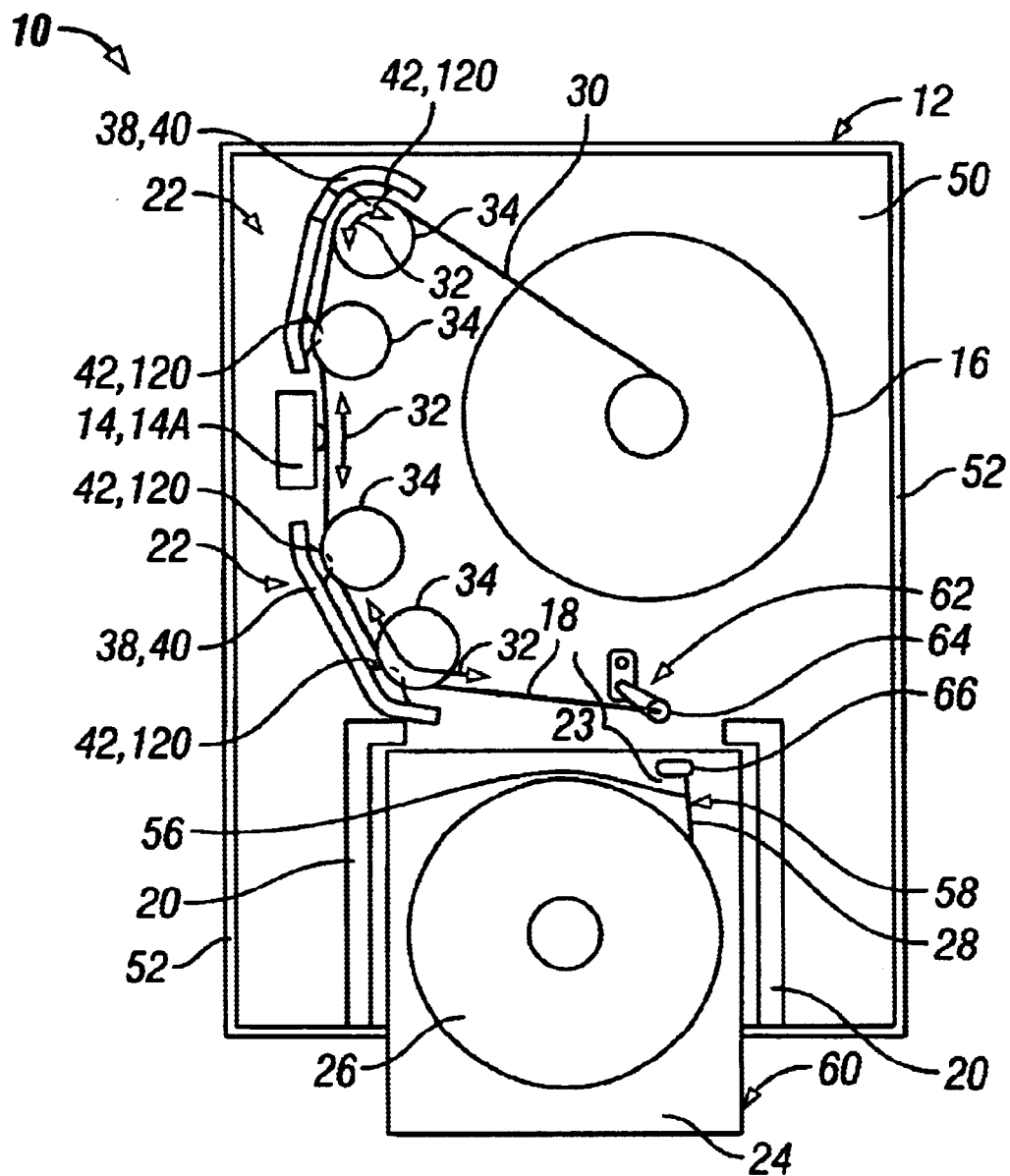
FIG. 1 is a simplified diagrammatic plan view of a tape drive and a tape cartridge, with a portion of a drive housing of the tape drive removed for clarity, the tape drive having features of the present invention.

Referring initially to FIG. 1, a tape drive 10 having features of the present invention includes a drive housing 12, one or more head assemblies 14, a take-up reel 16, a take-up leader 18, a cartridge receiver 20, and a guide assembly 22. The tape drive 10 is designed for use in conjunction with a cartridge 24 that can include a cartridge reel 26, a cartridge leader 28, and a storage tape 30 (sometimes referred to herein as "tape"). The tape drive 10 and cartridge 24 can also include a buckle 23.

The guide assembly 22 guides the storage tape 30 between the cartridge reel 26 and the take-up reel 16, along a tape path 32 (indicated generally by directional arrows on FIGS. 1 and 2) that passes near the head assembly 14. The guide assembly 22 includes (i) one or more tape rollers 34, each having a longitudinal axis 36, and (ii) one or more tape guides 38. Each of the tape guides 38 includes a guide body 40. At least one of the tape guides 38 also includes a tape support 42 (shown partly in phantom on FIGS. 1 and 2) that can be secured to the guide body 40. Each tape support 42 is sized, shaped and positioned to support the storage tape 30 following a loss of tension in the storage tape 30. The tape support 42 has significant flexibility in a lateral direction that basically follows the tape path 32 and is substantially less flexible in a direction that is generally parallel to the longitudinal axis 36 of the tape roller 34. With this design, the tape support 42 can be subjected to repeated contact with the buckle 23, while continuing to maintain the ability to support the storage tape 30 when necessary.

Figure 3:
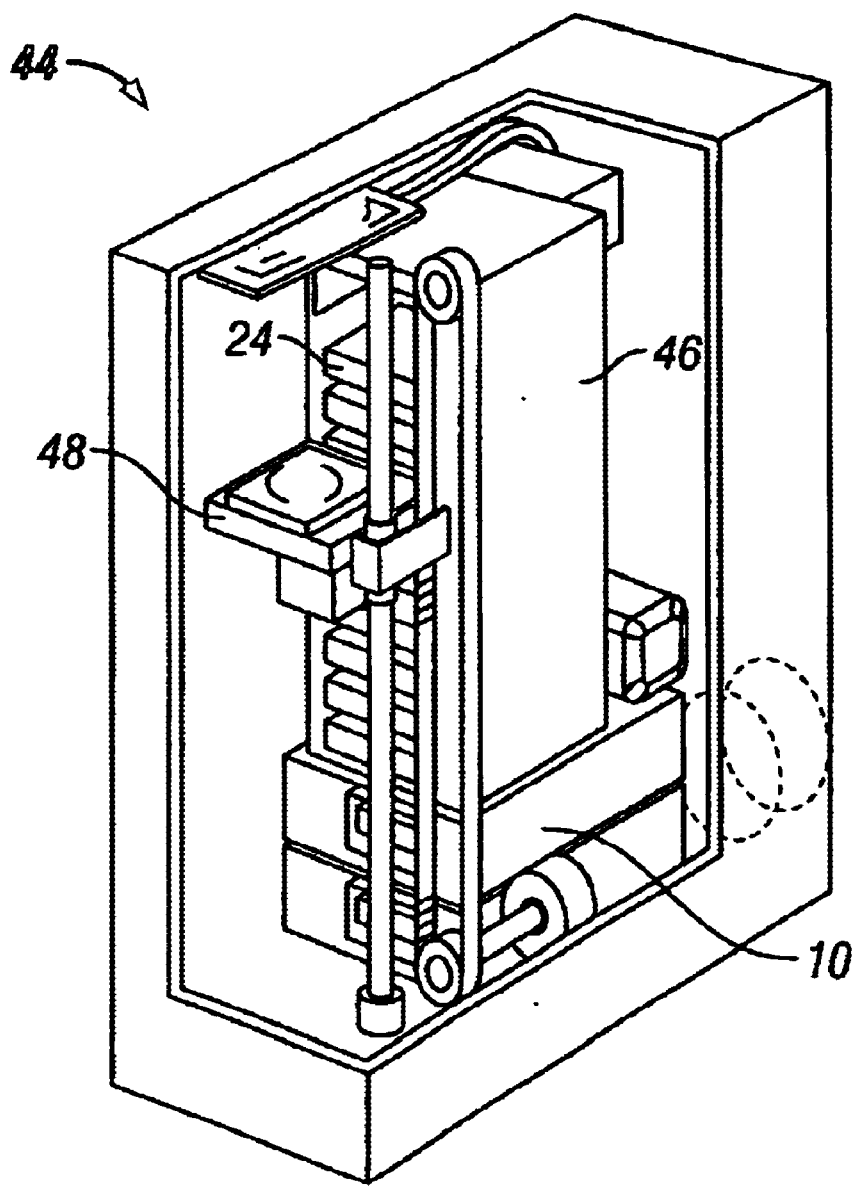
FIG. 3 is a perspective, partly cut-away view of a tape library having features of the present invention.

The tape drive 10 can be installed within a computer (not shown) or a tape drive array (not shown). Alternatively, referring to FIG. 3, the tape drive 10 can be utilized as part of a tape library 44. In the embodiment illustrated in FIG. 3, the tape library 44 includes a plurality of cartridges 24 which are retained in a cartridge magazine 46, a robotic cartridge handler 48 and a pair of tape drives 10. The robotic cartridge handler 48 selectively retrieves one of the cartridges 24 from the cartridge magazine 46 and places the cartridge 24 within one of the tape drives 10. For example, a suitable tape library 44 is sold under the trademark DLTstor™, by Quantum Corporation.

A detailed description of the various components of a tape drive 10, is provided in U.S. Pat. No. 5,371,638, issued to Saliba, and assigned to Quantum Corporation, the Assignee of the present invention. The contents of U.S. Pat. No. 5,371,638 are incorporated herein by reference. Nevertheless, structural aspects of the tape drive 10 which are particularly significant to the present invention are provided herein. Representative tape drives 10 are sold by Quantum Corporation, the assignee of the present invention, under the trademarks DLT™4000 and DLT™7000, for example.

The drive housing 12 retains the various components of the tape drive 10. The drive housing 12, illustrated in FIG. 1, includes a base 50, four spaced apart side walls 52 and a cover (not shown in FIG. 1 for clarity).

Figure 2:
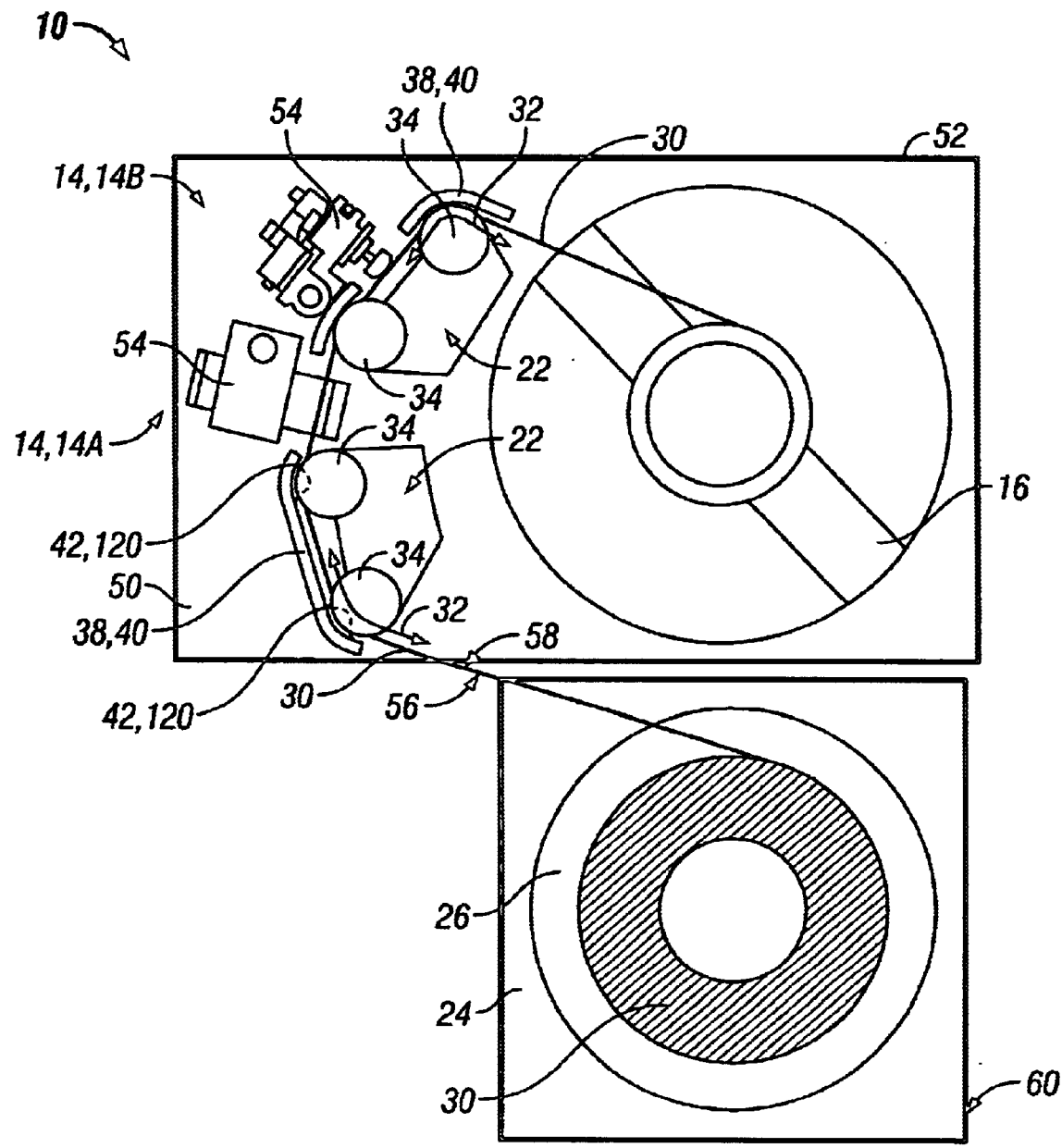
FIG. 2 is a simplified diagrammatic plan view of another embodiment of a tape drive and tape cartridge, with a portion of a drive housing of the tape drive removed for clarity, the tape drive having features of the present invention.

The tape drive 10 includes the one or more head assemblies 14 that read and/or write user data (not shown) from and/or onto the storage tape 30. The design and number of head assemblies 14 can vary depending upon the requirements of the tape drive 10. For example, in the embodiment illustrated in FIG. 1, the tape drive 10 includes a first head assembly 14A. Alternatively, the tape drive 10 can include a plurality of head assemblies 14 including the first head assembly 14A and a second head assembly 14B, as illustrated in FIG. 2. Still alternatively, each tape drive 10 can include more than two head assemblies 14. Each head assembly 14 can also include a positioning mechanism 54 that positions the head assembly 14 relative to the storage tape 30. A detailed description of the various components of the head assemblies 14 is provided in U.S. Pat. No. 6,188,532 issued to Albrecht, et al. and assigned to Quantum Corporation, in U.S. Pat. No. 6,246,535 issued to Saliba, et al. and assigned to Quantum Corporation, and in co-pending U.S. Pat. No. 09/685,418, the contents of which are incorporated by reference herein.

The storage tape 30 stores data in a form that can be subsequently retrieved if necessary. A magnetic storage tape 30 is commonly used to store data in digital form. The storage tape 30 can have a tape width of at least approximately four millimeters to eight millimeters. The storage tape 30 can also be wider or narrower than this range. The thickness of the storage tape 30 can likewise vary. Thicknesses of approximately one-half mil are relatively common, although thinner or thicker tape 30 can be used. In general, thinner tape 30 tends to be less rigid than thicker tape 30, which can lead to decreased control over movement of the tape 30.

The storage tape 30 includes a storage surface 56 on one side of the storage tape 30 for storing data, and a guide surface 58 on the opposite side of the storage tape 30 that contacts the tape rollers 34. The storage surface 56 directly faces and contacts the head assembly 14. The storage surface 56 is divided into a plurality of tracks (not shown). Each track can be a linear pattern that extends the length of the storage tape 30. Alternately, for example, the data can be recorded in diagonal strips (not shown) across the storage tape 30. The storage tape 30 is initially retained on the cartridge reel 26 of the cartridge 24.

Each cartridge 24 illustrated in FIGS. 1 and 2 includes a substantially rectangular cartridge housing 60 that can enclose the cartridge reel 26 and the storage tape 30. However, the cartridges 24 can vary in size and shape. For example, suitable cartridges 24 are sold by Quantum Corporation. The cartridge housing 60 includes a cartridge door (not shown for clarity) that pivots between an open door position in which a portion of the buckle 23 is exposed and a closed door position.

The buckle 23 temporarily secures the cartridge leader 28 to take-up leader 18 of the tape drive 10. The design of the cartridge leader 28 can vary depending upon the requirements of the take-up leader 18 and the tape drive 10. The tape drive 10 can include a buckling mechanism 62 that moves the take-up leader 18 to secure the buckle 23. A suitable buckling mechanism is disclosed in U.S. Pat. No. 6,092,754, the contents of which are incorporated herein by reference.

Figure 4:
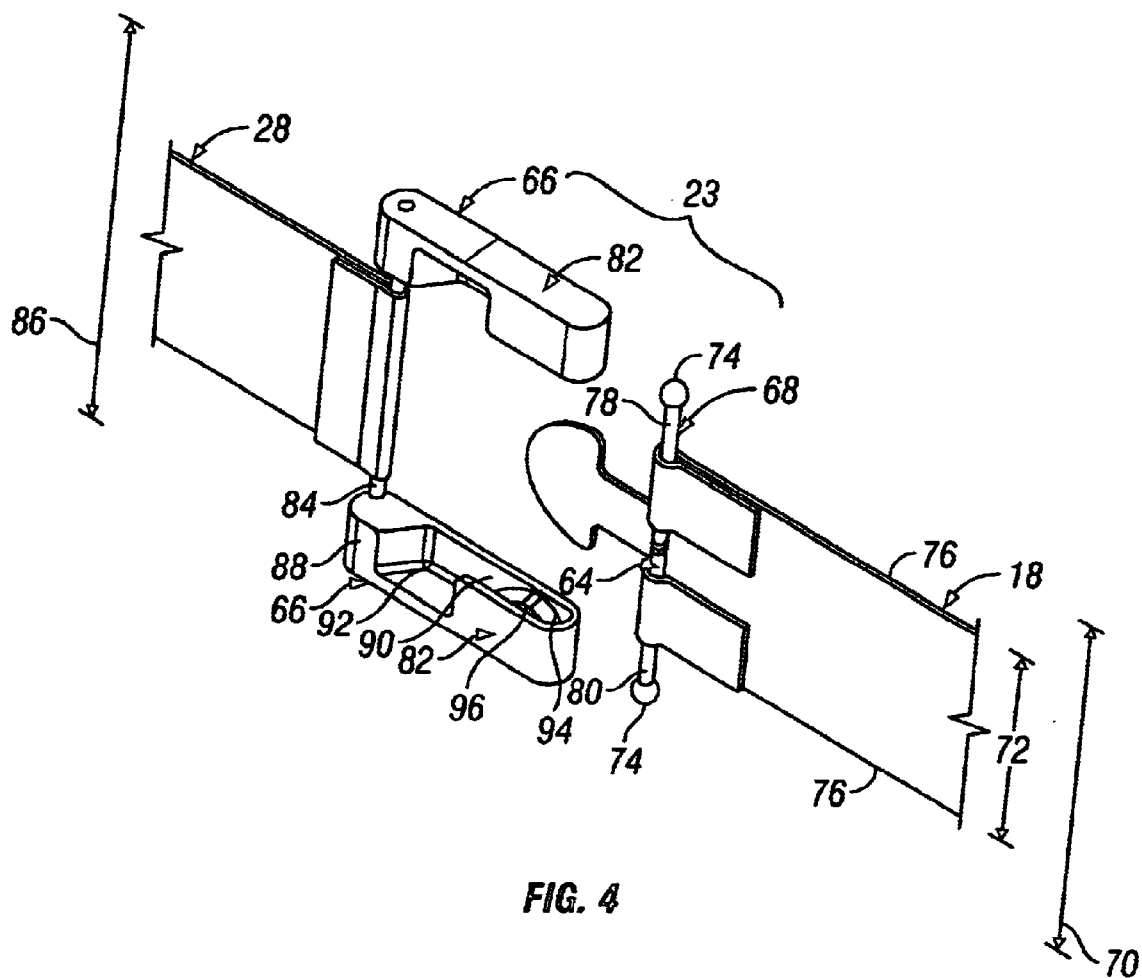
FIG. 4 is a perspective view of a buckle having features of the present invention.

The design of the buckle 23 can vary depending upon the design requirements of the buckling mechanism 62 and/or the tape drive 10. FIG. 4 illustrates a buckle 23 suitable for use in the present invention. In the embodiment illustrated in FIG. 4, the buckle 23 includes a first buckle component 64 attached to the take-up leader 18 and a second buckle component 66 attached to the cartridge leader 28. The buckle 23 securely couples the cartridge leader 28 to the take-up leader 18. Further, as provided herein, the buckle 23 can be formed from durable materials to increase the operational life of the buckle 23.

FIG. 4 illustrates the first buckle component 64 including a bar-shaped, buckle bar 68 which is secured to the take-up leader 18. The buckle bar 68 is a substantially straight piece of rigid material, having a substantially circular cross section. The buckle bar 68 extends transversely across the take-up leader 18. The buckle bar 68 preferably has a bar length 70 which is greater than a leader width 72 of the take-up leader 18, as illustrated in FIG. 4. In this embodiment, because the bar length 70 is greater than the leader width 72, the buckle bar 68 has a pair of bar ends 74 that cantilever past opposed edges 76 of the take-up leader 18. Stated another way, the buckle bar 68 includes a first bar section 78 that extends away from the leader edges 76 and a second bar section 80 that extends away from the other leader edge 76 of the take-up leader 18.

The second buckle component 66 includes a pair of spaced-apart bar receivers 82. Each bar receiver 82 is sized and shaped to receive a portion of one of the bar sections 78, 80, to couple the take-up leader 18 to the cartridge leader 28. The use of two spaced-apart bar receivers 82 ensures a reliable connection between the leaders 18, 28.

As illustrated in FIG. 4 for example, each of the bar ends 74 of the buckle bar 68 is spherical shaped. Further, in this embodiment, the bar receivers 82 are secured together with a connector bar 84, which is attached to the cartridge leader 28. In this embodiment, the bar receivers 82 are spaced apart a receiver distance 86 by the connector bar 84.

The receiver distance 86 can be longer than the leader width 72. This would allow the bar receivers 82 to engage a cartridge stop (not shown) in the cartridge 24 to inhibit the cartridge leader 28 from being pulled back into the cartridge 24. Further, this keeps the buckle 23 away from the cartridge reel 26 and out of the path of the storage tape 30 to protect the storage tape 30 from damage.

In the embodiment shown in FIG. 4, each bar receiver 82 is sized and shaped to receive one of the bar ends 74. Each bar receiver 82 is defined by a substantially rectangular receiver housing 88. Each receiver housing 88 includes a channel 90 having a channel opening 92 and a channel end 94. During coupling, the buckle bar 68 is inserted into the channel opening 92. Subsequently, the buckle bar 68 is forced to slide in the channel 90 until the buckle bar 68 reaches the channel end 94.

Each channel 90 can include a bump 96 which projects into the channel 90 near the channel end 94. The bump 96 reliably holds the buckle bar 68 against the channel end 94. Each bump 96 can be ramp-shaped to facilitate movement over the bump 96. Alternatively, for example, each bump 96 can be semi-circular shaped, or can assume other suitable shapes. Each channel 90 is wide enough to receive the buckle bar 68. Further, the channels 90 can be spaced apart so that a bottom of each channel 90 substantially contacts the bar ends 74 of the buckle bar 68 when the buckle bar 68 is placed in the channels 90.

A detailed description and a number of alternate embodiments of the buckle 23 are illustrated and described in U.S. Pat. No. 6,092,754 issued to Rathweg, et al., and assigned to Quantum Corporation. Additionally, the take-up leader 18 and the cartridge leader 28 may be buckled using other suitable designs such as those described in U.S. Pat. Nos. 4,662,049 and 4,720,913 issued to Hertrich, as examples. Each such embodiment can be utilized with the present invention. The contents of U.S. Pat. Nos. 6,092,754, 4,662,049 and 4,720,913 are incorporated herein by reference.

The guide assembly 22 guides movement of the storage tape 30 back and forth between the cartridge reel 26 and the take-up reel 16, past each head assembly 14. The guide assembly 22 includes one or more tape rollers 34 and the tape guide 38. For example, the guide assembly 22 illustrated in FIGS. 1 and 2 includes four tape rollers 34. However, the guide assembly 22 can include more or less than four tape rollers 34.

The design of the tape rollers 34 can vary depending upon the requirements of the tape drive 10 and the guide assembly 22. The tape rollers 34 of the guide assembly 22 can be of similar configuration, or the tape rollers 34 can vary in configuration. Some of the basic features of the tape rollers 34 are provided in U.S. Pat. Nos. 5,088,172 and 5,199,168, both of which are issued to Daly. The contents of U.S. Pat. Nos. 5,088,172 and 5,199,168 are incorporated herein by reference. Nevertheless, structural aspects of the tape rollers 34 which are particularly significant to the present invention are provided herein.

Figure 5:
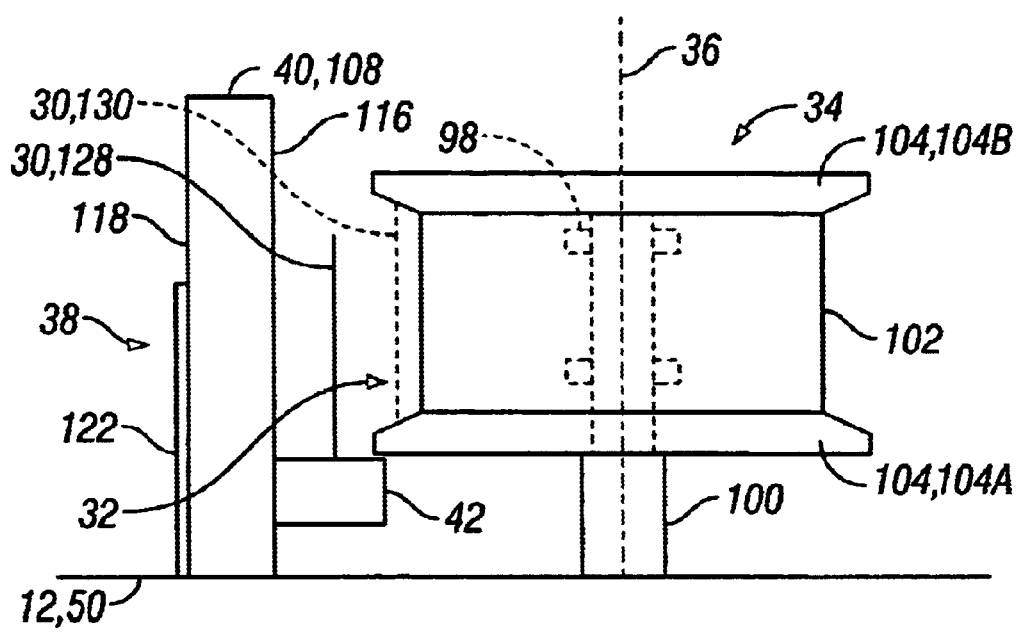
FIG. 5 is a side view illustration of a portion of a guide assembly and a storage tape.
Figure 6:
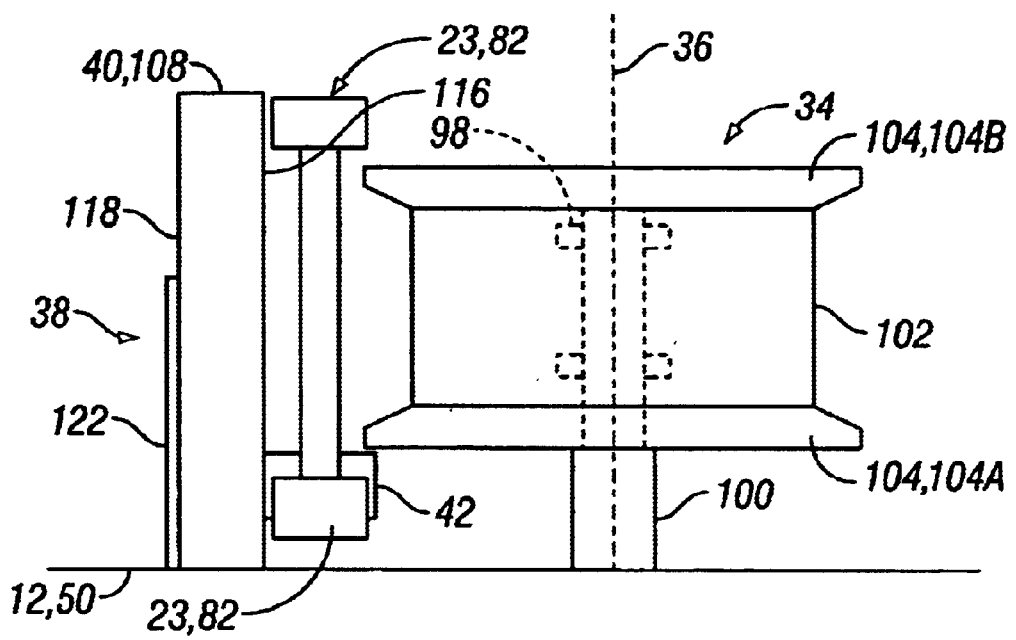
FIG. 6 is a side view illustration of a portion of a guide assembly having features of the present invention, and a portion of a buckle.

FIGS. 5 and 6 illustrate one embodiment of the tape roller 34. In this embodiment, each tape roller 34 is rotatably mounted to the drive housing 12 on a bearing 98 (shown in phantom) and a stem 100. The tape roller 34 includes the longitudinal axis 36 (shown in phantom). In this embodiment, each tape roller 34 rotates on the bearing 98 substantially around the longitudinal axis 36.

In the embodiments illustrated in FIGS. 5 and 6, each tape roller 34 includes an adjacent roller portion 102. The stem 100 elevates the roller portion 102 from the drive housing 12 for contact with the storage tape 30. The roller portion 102 contacts the storage tape 30 during movement of the storage tape 30 along the tape path 32. The roller portion 102 can be substantially spool-shaped, although other configurations for the roller portion 102 can be used. The roller portion 102 and the stem portion 100 can be formed as a unitary structure, or each portion 100, 102, can be separately formed.

In the embodiments shown in FIGS. 5 and 6, the roller portion 102 includes one or more flanges 104. The flanges 104 assist in maintaining the storage tape 30 on the roller portion 102 during movement of the tape 30 along the tape path 32. The design of each flange 104 can vary depending upon the design requirements of the tape roller 34 and the tape drive 10. The embodiments provided in FIGS. 5 and 6 each show a tape roller 34 having two flanges 104, including a lower flange 104A positioned near the stem portion 100, and an upper flange 104B positioned on an opposite end of the roller portion 102.

Figure 7:
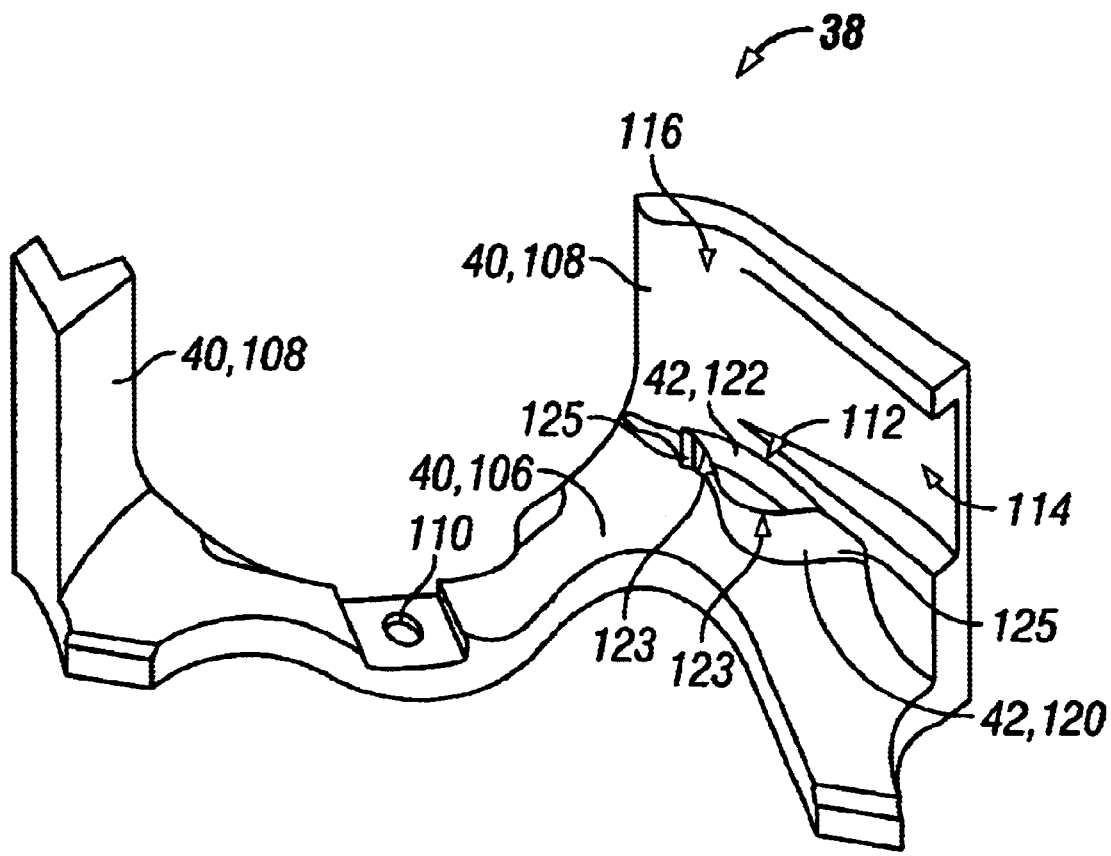
FIG. 7 is a perspective view of a tape guide including a guide body and a tape support having features of the present invention.
Figure 8:
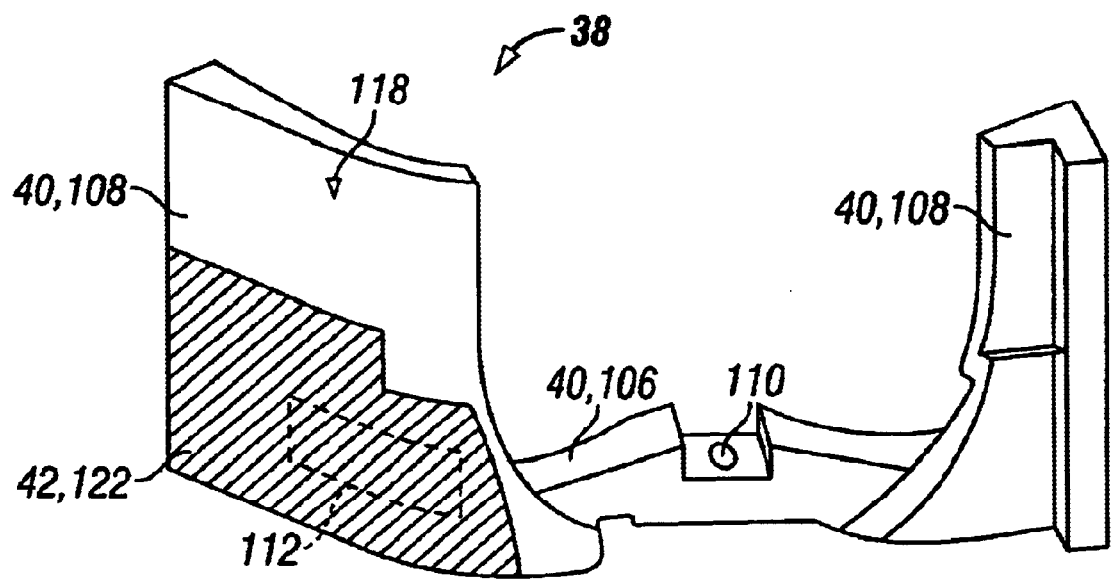
FIG. 8 is another perspective view of the tape guide in FIG. 7.

The tape guide 38 is positioned to guide the storage tape 30 for travel along the tape path 32, which is positioned substantially between the tape guide 38 and the tape roller 34. The design of the tape guide 38 can vary depending upon the requirements of the guide assembly 22 and the tape drive 10. FIGS. 7 and 8 illustrate one embodiment of the tape guide 38, with the tape roller 34 removed for clarity. As previously indicated, the tape guide 38 shown in the Figures includes the guide body 40 and the tape support 42. Alternately, for example, the tape guide 38 can include only the tape support 42.

Further, the number of tape guides 38 can vary depending upon the design requirements of the guide assembly 22 and the tape drive 10. For example, one or more tape guides 22 can be positioned near each tape roller 34. Conversely, the number of tape guides 22 can be less than the number of tape rollers 34.

Referring to FIG. 7, the guide body 40 can include a guide base 106 that is coupled to the housing base (not shown in FIG. 7), and one or more guide walls 108. The configuration and positioning of the guide base 106 can be varied to suit the design requirements of the guide assembly 22 and the tape drive 10. The guide base 106 can include a guide base aperture 110 through which a guide base fastener (not shown) can secure the guide base 106 to the drive housing (not shown in FIG. 7).

In this embodiment, at least one of the guide walls 108 includes one or more body openings 112 (one body opening 112 is shown in phantom on FIG. 8) through which the tape support 42 can extend, as explained below. One or more of the guide walls 108 can also include a guide track 114 that assists in guiding the storage tape 30 along the tape path 32. Further, each guide wall 108 can have a first side 116 that generally faces the tape roller 34, and a second side 118 that generally faces away from the tape roller 34. The number of sides can vary, however, and can include more or less than the first side 116 and the second side 118.

In this embodiment, the body opening 112 allows the tape support 42 to extend through the guide body 40. Thus, the tape support 42 is not required to be directly secured to the first side 116 of the guide wall 108. With this design, interference by the tape support 42 of movement of the buckle 23 is inhibited, thereby allowing the buckle to more easily pass along the tape guide 38. The size and shape of the body opening 112 can vary depending upon the requirements of the tape support 42 and the tape drive 10. In the embodiment illustrated in FIG. 8, the body opening 112 is generally rectangular in shape. Alternatively, the body opening 112 can be slot-like or can assume other suitable shapes and sizes. Moreover, the number of body openings 112 on each guide body 40 can vary. Although one body opening 112 is shown in FIG. 8, each guide body 40 can have more or less than one body opening 112.

Figure 9:
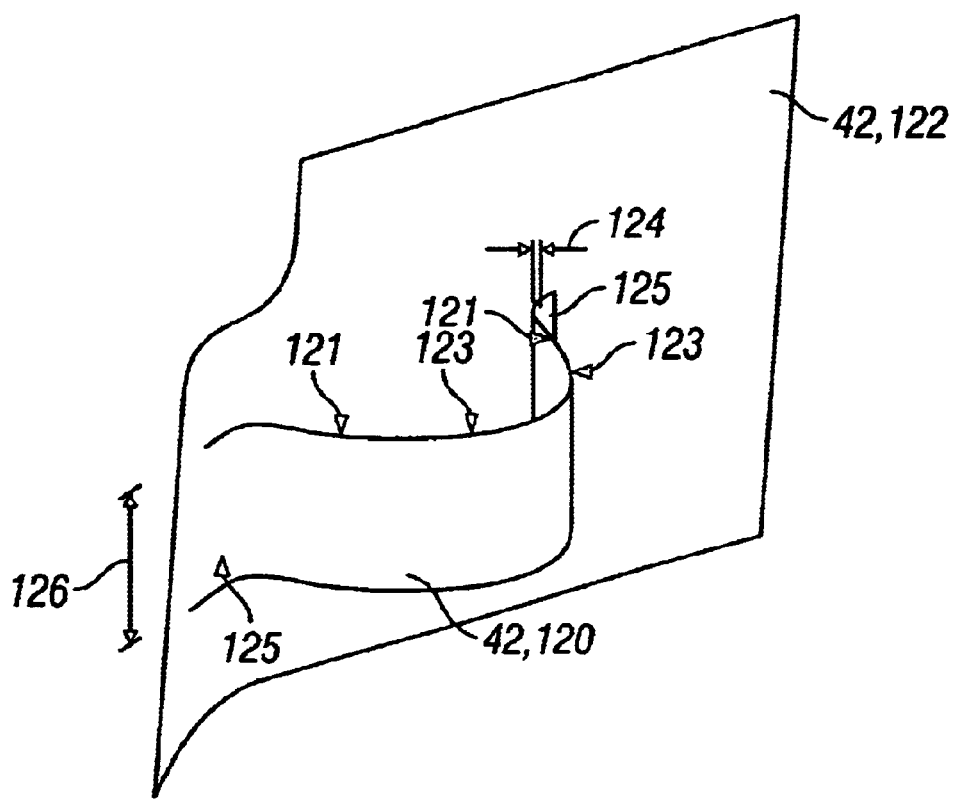
FIG. 9 is a perspective view of the tape support illustrated in FIG. 7.

As previously explained, the tape support 42 can support the storage tape 30 in the event of a loss of tension in the storage tape 30. The size, shape and positioning of the tape support 42 can vary depending upon the requirements of the guide assembly 22 and the tape drive 10. The tape support 42 can include a curved region 120 and a support backing 122. As illustrated in FIGS. 7 and 9, the curved region 120 can be secured to the support backing 122 in one or more locations. For example, the curved region 120 can have one or more support ends 125 that are each secured to the support backing 122. Alternately, the support ends 125 of the curved region 120 can be secured to the guide body 40, as provided below. The curved region 120 and the support backing 122 can be formed separately and secured together with adhesive (not shown), for example. Alternatively, the curved region 120 and the support backing 122 can be formed as a unitary structure.

As a further alternative, the curved region 120 can be secured directly to the guide body 40, without the necessity of incorporating the support backing 122 into the present invention. In this alternative embodiment, the tape guide 38 can include or exclude the body opening 112. Without the body opening 112, the curved region 120 can be secured to the first side 116 of the guide wall 108 of the tape guide 38. In an embodiment that includes the body opening 112, the curved region 120 can be secured to the second side 118 of the guide wall 108, and can extend through the body opening 112 toward the tape roller 34. Still alternately, the tape support 42 can be secured directly to the drive housing 12.

In the embodiment shown in FIGS. 7 and 9, the curved region 120 cantilevers from the support backing 122, through the body opening 112 (not shown on FIG. 9), and generally toward the stem portion 100 of the tape roller 34 (not shown in FIGS. 7 and 9). In this embodiment, and as illustrated in FIGS. 5 and 6, for example, the curved region 120 extends to near the lower flange 104A of the tape roller 34, below the tape path (not shown in FIG. 6). Alternatively, the curved region 120 can extend to near the upper flange 104B of the tape roller 34 depending upon the orientation of the tape drive 10 relative to the tape library 44 or the force of gravity.

The curved region 120 can define a curve 123 that is generally positioned within a plane that is substantially perpendicular to the longitudinal axis 36 of the tape roller 34. The shape of the curve 123 can vary depending upon the configuration of the curved region 120 and the design requirements of the tape drive 10. The curved region 120 can include at least two points 121 along the curve 123 that are adapted to support the storage tape 30 during a loss of the required tension in the storage tape 30. The points 121 illustrated on FIG. 9 are shown for representative purposes only, as any point 121 along the curve 123 can support the storage tape 30.

FIG. 8 shows a rear perspective view of the tape guide of FIG. 7. The support backing 122 inhibits the curved region 120 from being pushed through the body opening 112, away from the tape roller 34. As shown in FIG. 8, the support backing 122 (shown with shading) can be secured to the second side 118 of the guide wall 108 of the tape guide 38. The shape, size and positioning of the support backing 122 can be varied depending upon the configuration of the tape guide 38 and the design requirements of the tape drive 10. The support backing 122 illustrated in FIGS. 8 and 9 is substantially flat, and can be adhered to the second side 118 of the guide wall 108 with an adhesive (not shown), for example. Alternatively, the support backing 122 can be configured to follow a contour of the tape guide 38, which may be in a shape other than substantially flat.

FIG. 9 illustrates the tape support 42, including the curved region 120 and the support backing 122, with the guide body 40 removed for clarity. The materials used to form the tape support 42 can vary. For example, the tape support 42 can be constructed from a flexible plastic film material, or other suitably flexible materials that can support the storage tape 30 in the event the tape 30 falls onto the tape support 42 due to a loss of tension in the storage tape 30.

The tape support 42 has a support thickness 124 when positioned in the tape drive 10 that is measured in a direction that is substantially perpendicular to the longitudinal axis 36 of the tape roller 34. The support thickness 124 can vary depending upon the materials used and the design requirements of the tape drive 10. For instance, the support thickness 124 can range between approximately one-tenth of one mil and one hundred mils. Alternatively, the support thickness can be approximately one mil. However, the support thickness 124 can vary between the curved region 120 and the support backing 122.

Further, the curved region 120 has a support width 126 when positioned in the tape drive 10 that is measured in a direction that is substantially parallel to the longitudinal axis 36 of the tape roller 34. The support width 126 can vary depending upon the materials used and the design requirements of the tape drive 10. For example, the support width 126 can range from between approximately ten mils to five hundred mils. Alternatively, the support width 126 can be between approximately one hundred mils and three hundred mils. The support width 126 can further be designed relative to the support thickness 124. For instance, the support width 126 can be greater than the support thickness 124. Alternatively, the support width 126 can be within the range of approximately two to fifty thousand times the support thickness 124. In one embodiment of the present invention the support width 126 is approximately two hundred fifty times the support thickness 124. Moreover, the tape support 42 can be sized and shaped to have greater flexibility in the lateral direction that generally follows the tape path 32 than in a direction that is substantially parallel to the longitudinal axis 36 of the tape roller 34.

Referring back to FIG. 5, the tape support 42 extends from near the guide wall 108 toward the lower flange 104A of the tape roller 34. Alternately, for example, the tape support 42 can be positioned between tape rollers 34 beneath the tape path 32. When the storage tape 30 tension is lost, the tape support 42 prevents the storage tape 30 from gravitating into a region between the tape guide 38 and beneath the lower flange 104A of the tape roller 34, i.e. near the stem portion 100. The tape support 42 substantially maintains the position of the storage tape 30 (shown by a solid line 128 in FIG. 5) at or near the tape path 32. As tension in the storage tape 30 is regained, the lower flange 104A of the tape roller 34 facilitates proper positioning of the storage tape 30 (shown by a dashed line 130 on FIG. 5). Because the tape support 42 can be positioned below or above the tape path 32, the data area (not shown) of the storage tape 30 avoids contact with the tape support 42, thereby preventing damage to the data area of the storage tape 30.

The tape support 42 is sized and shaped to enable the buckle 23 to move along the tape path 32, between the tape guides 38 and the tape rollers 34. FIG. 6 illustrates initial contact between the buckle 23 and the tape support 42. Upon contact, the tape support 42 can easily flex or fold in the direction of travel of the buckle 23, allowing the buckle 23 to continue down the tape path 32 with minimal resistance to movement of the buckle 23 by the tape support 42. Because the ratio of the support width 126 to the support thickness 124 is greater than one, and in some embodiments, substantially greater than one as explained above, the tape support 42 can withstand contact with the buckle 23 throughout the life of the tape drive 10 without failure of the tape support 42. Once the buckle 23 has passed by the tape support 42, the tape support 42 returns to an unflexed or unfolded state.

While the particular tape drive 10 and guide assembly 22 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape guide for a guide assembly of a tape drive, the tape drive being adapted for use with a tape cartridge having a storage tape that moves along a tape path, the tape drive including a drive housing, the guide assembly including a tape roller having a longitudinal axis, the tape guide comprising:
   a guide body coupled to the drive housing near the tape roller; and
      a tape support secured to the guide body, the tape support being formed from a substantially flat film material having (i) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness, the tape support positioned to support an edge of the storage tape during a loss of tension of the storage tape.

2. The tape guide of claim 1 wherein the tape support extends from the guide body substantially toward the tape roller.

3. The tape guide of claim 1 wherein the support width is at least approximately two times greater than the support thickness.

4. The tape guide of claim 1 wherein the support width is at least approximately ten times greater than the support thickness.

5. The tape guide of claim 1 wherein the tape support includes a curved region and two support ends that are secured to the guide body.

6. The tape guide of claim 1 wherein the tape support includes a curved region positioned to support the edge of the storage tape on at least two points along the curved region during a loss of tension of the storage tape.

7. A guide assembly for a tape drive, the guide assembly including a tape roller having a longitudinal axis, and the tape guide of claim 1.

8. A tape drive including a cartridge receiver and the guide assembly of claim 7.

9. A tape library including a cartridge magazine and the tape drive of claims 8.

10. A tape guide for a guide assembly of a tape drive, the tape drive being adapted for use with a tape cartridge having a storage tape that moves along a tape path, the tape drive including a drive housing, the guide assembly including a tape roller having a longitudinal axis, the tape guide comprising:
    a guide body coupled to the drive housing near the tape roller wherein the guide body has a body opening, and wherein the tape support extends through the body opening; and
    a tape support secured to the guide body, the tape support having (i) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness, the tape support positioned to support an edge of the storage tape during a loss of tension of the storage tape.

11. The tape guide of claim 10 wherein the tape support is formed from a substantially flat film material.

12. The tape guide of claim 10 wherein the tape support includes a support backing that secures the tape support to the guide body.

13. The tape guide of claim 12 wherein the tape support includes a curved region and two support ends that are secured to the support backing.

14. A tape guide for a guide assembly of a tape drive, the tape drive being adapted for use with a tape cartridge having a storage tape that moves along a tape path, the tape drive including a drive housing, the guide assembly including a tape roller having a longitudinal axis, the tape guide comprising:
    a guide body coupled to the drive housing near the tape roller; and
       a tape support secured to the guide body, the tape support being sized and shaped to have greater flexibility in a direction that generally follows the tape path than in a direction that is substantially parallel to the longitudinal axis of the tape roller and having (i) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness, the tape support positioned to support an edge of the storage tape during a loss of tension of the storage tape.

15. A tape guide for a guide assembly of a tape drive, the tape drive being adapted for use with a tape cartridge having a storage tape that travels along a tape path, the tape drive including a drive housing, the guide assembly including a tape roller having a longitudinal axis, the tape guide comprising:
    a tape support including a curved region positioned approximately below the tape path, the tape support positioned to support an edge of the storage tape during a loss of tension of the storage tape; and
    a guide body, wherein the tape support includes two support ends that are secured to the guide body.

16. The tape guide of claim 15 further comprising a guide body coupled to the drive housing, the guide body having a body opening, and wherein the tape support extends through the body opening.

17. The tape guide of claim 16 wherein the tape support includes a support backing that secures the tape support to the guide body.

18. The tape guide of claim 15 wherein the tape support is sized and shaped to have greater flexibility in a direction that generally follows the tape path than in a direction that is substantially parallel to the longitudinal axis of the tape roller.

19. The tape guide of claim 15 wherein the tape support has (I) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness.

20. The tape guide of claim 19 wherein the support width is at least approximately two times greater than the support thickness.

21. The tape guide of claim 19 wherein the support width is at least approximately ten times greater than the support thickness.

22. The tape guide of claim 15 wherein the tape support is formed from a substantially flat film material.

23. A tape guide for a guide assembly of a tape drive, the tape drive being adapted for use with a tape cartridge having a storage tape, the tape drive including a drive housing, the guide assembly including a tape roller having a longitudinal axis and a flange, the tape guide comprising:
   a guide body coupled to the drive housing; and
   a tape support that extends from the guide body substantially toward the tape roller, the tape support being a substantially flat film material having (i) a support width that is measured in a direction that is substantially parallel to the longitudinal axis of the tape roller, and (ii) a support thickness that is measured in a direction that is substantially perpendicular to the longitudinal axis, the support width being at least approximately ten times greater than the support thickness, the tape support including a curved region that is positioned near the flange of the tape roller, the tape support positioned to support an edge of the storage tape during a loss of tension of the storage tape.

24. The tape guide of claim 23 wherein the guide body has a body opening, the tape support extends through the body opening, the tape support including a support backing that secures the tape support to the guide body, the curved region having at least two support ends that are secured to the support backing.

25. A guide assembly for a tape drive, the guide assembly including a tape 14 roller and the tape guide of claim 23.

26. A tape drive including a cartridge receiver and the guide assembly of claim 25.

27. A tape library including a cartridge magazine and the tape drive of claim 26.

28. A tape drive adapted for use with a cartridge, the cartridge including a cartridge reel, and a storage tape wound about the cartridge reel, the tape drive comprising:
   a take-up reel;
   a cartridge receiver that receives the cartridge;
   a tape roller positioned to define a tape path between the take-up reel and the cartridge reel, the tape roller having a longitudinal axis; and
   a tape guide positioned near the tape roller so that the storage tape moves there between, the tape guide including a guide body and a tape support secured to the guide body, the tape support being formed from a substantially flat film material and having (i) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness, the tape support positioned to support an edge of the storage tape during a loss of tension of the storage tape.

29. A tape library including a cartridge magazine and the tape drive of claim 28.

30. The tape drive of claim 28 wherein the tape support extends from the guide body substantially toward the tape roller.

31. The tape drive of claim 28 wherein the support width is at least approximately two times greater than the support thickness.

32. The tape drive of claim 28 wherein the tape support includes a support backing that secures the tape support to the guide body.

33. The tape drive of claim 28 wherein the tape support includes a curved region positioned near a flange of the tape roller.

34. A tape drive adapted for use with a cartridge, the cartridge including a cartridge reel, and a storage tape wound about the cartridge reel, the tape drive comprising:
   a take-up reel;
   a cartridge receiver that receives the cartridge;
   a tape roller positioned to define a tape path between the take-up reel and the cartridge reel, the tape roller having a longitudinal axis: and
   a tape guide positioned near the tape roller so that the storage tape moves there between, the tape guide including a guide body and a tape support secured to the guide body, wherein the guide body has a body opening, and wherein the tape support extends through the body opening, the tape support having (i) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness, the tape support positioned to support an edge of the storage tape during a loss of tension of the storage tape.

35. A tape drive adapted for use with a cartridge, the cartridge including a cartridge reel, and a storage tape wound about the cartridge reel, the tape drive comprising:
   a take-up reel;
   a cartridge receiver that receives the cartridge;
   a tape roller positioned to define a tape path between the take-up reel and the cartridge reel, the tape roller having a longitudinal axis; and
   a tape guide positioned near the tape roller so that the storage tape moves there between, the tape guide including a guide body and a tape support secured to the guide body, the tape support sized and shaped to have greater flexibility in a direction that generally follows the tape path than in the direction that is substantially parallel to the longitudinal axis of the tape roller and having (i) a support width that is measured in a direction that is substantially parallel to the longitudinal axis of the tape roller, and (ii) a support thickness that is measured in a direction that is substantially perpendicular to the longitudinal axis of the tape roller, the support width being greater than the support thickness, the tape support positioned to support an edge of the storage tape during a loss of tension of the storage tape.

36. The tape drive of claim 35 wherein the tape support is formed from a substantially flat film material.

* * * * *